Feb. 27, 1968     H. A. McILVAINE     3,370,415
GLOBAL CLOCKS

Filed Sept. 9, 1964     2 Sheets-Sheet 1

INVENTOR
HUBERT A. McILVAINE,

BY

ATTORNEYS

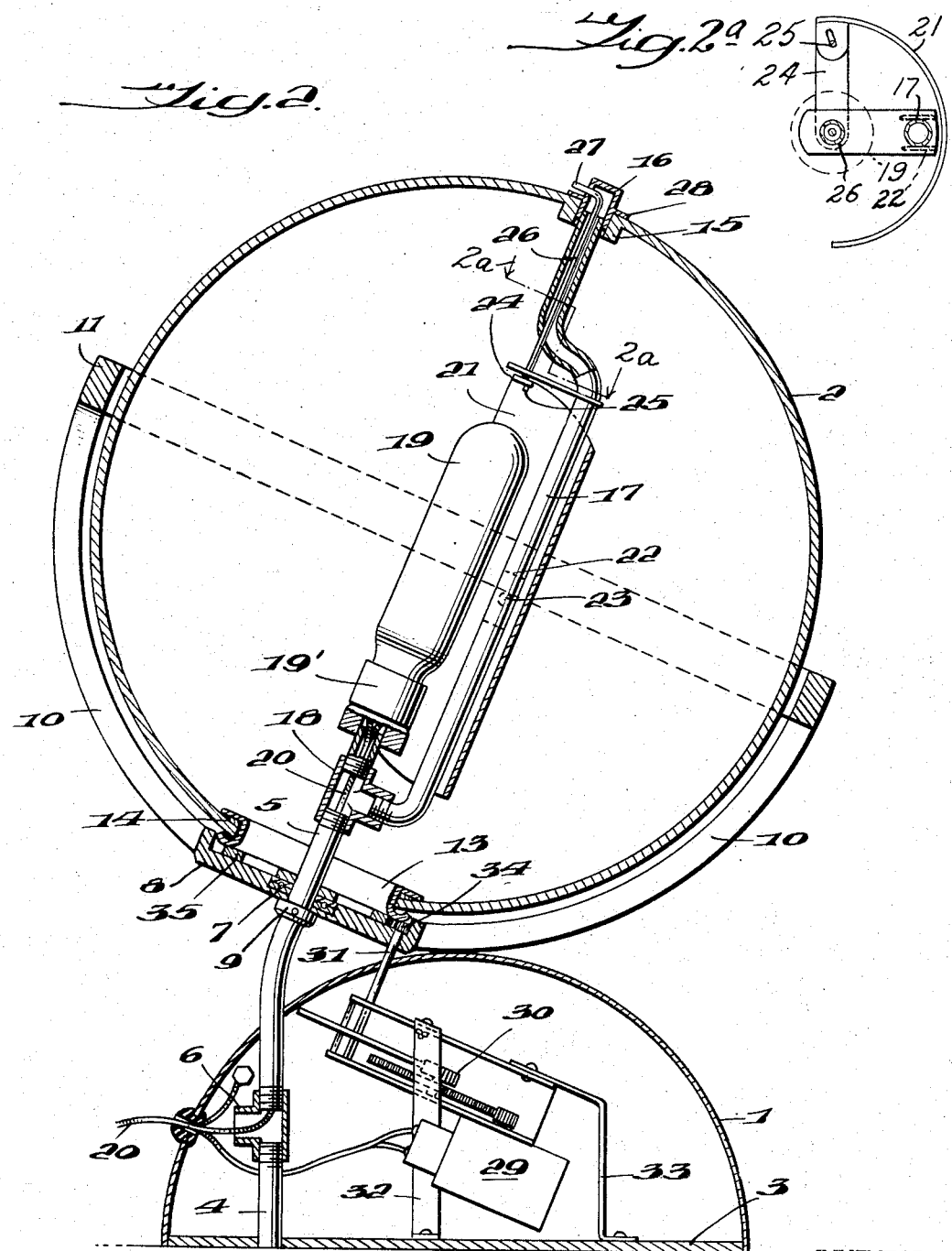

United States Patent Office 3,370,415
Patented Feb. 27, 1968

3,370,415
GLOBAL CLOCKS
Hubert A. McIlvaine, 418 Austin Ave.,
Geneva, Ill. 60134
Filed Sept. 9, 1964, Ser. No. 396,804
7 Claims. (Cl. 58—44)

This invention relates to improvements in global clocks of the character in which a globe is combined with clock mechanism so as to indicate time in various parts of the globe.

Various attempts have been made heretofore to provide for rotation of a globe in a definite time sequence, but these have not been entirely satisfactory and have failed to fulfill the requirements for such a device.

One object of this invention is to overcome the objections heretofore encountered in connection with global clocks and to improve the construction thereof.

Another object of the invention is to provide for the rotation of a globe in a definite time sequence corresponding with the rotation of the earth and to indicate in synchronism therewith the time prevailing in various parts of the earth.

Another object of the invention is to simulate on the globe the light and dark areas of the world, which may also be varied by changes in the seasons, and so as to show the parts of the globe that are subjected to sunshine at a particular time indicated on the globe.

These objects may be accomplished by providing a globe mounted on a base at an angle corresponding with the angle of rotation of the world. A synchronous motor may be used to turn the globe, causing it to make one complete revolution on its axis every twenty-four hours.

A time band may be mounted around the circumference of the globe, preferably in the region corresponding with the equator, and it has suitable indicia thereon for coaction with time belts applied on the globe, so as to indicate the time prevailing in various parts of the world.

A shell may be used so as to give a dark shadow over a portion of the globe that is normally out of sunlight and thus to indicate different areas that are subjected to night and day. It is thus possible to determine by visual inspection of the globe whether a particular area is subjected to sunlight.

One embodiment of the invention is illustrated in the accompanying drawings, in which:

FIG. 2 is a vertical sectional view therethrough; and

FIG. 2a is a detailed top plan view, partly in section, taken on the line 2a—2a in FIG. 2 and showing the adjusting mechanism for rocking the reflector.

Figure 1:
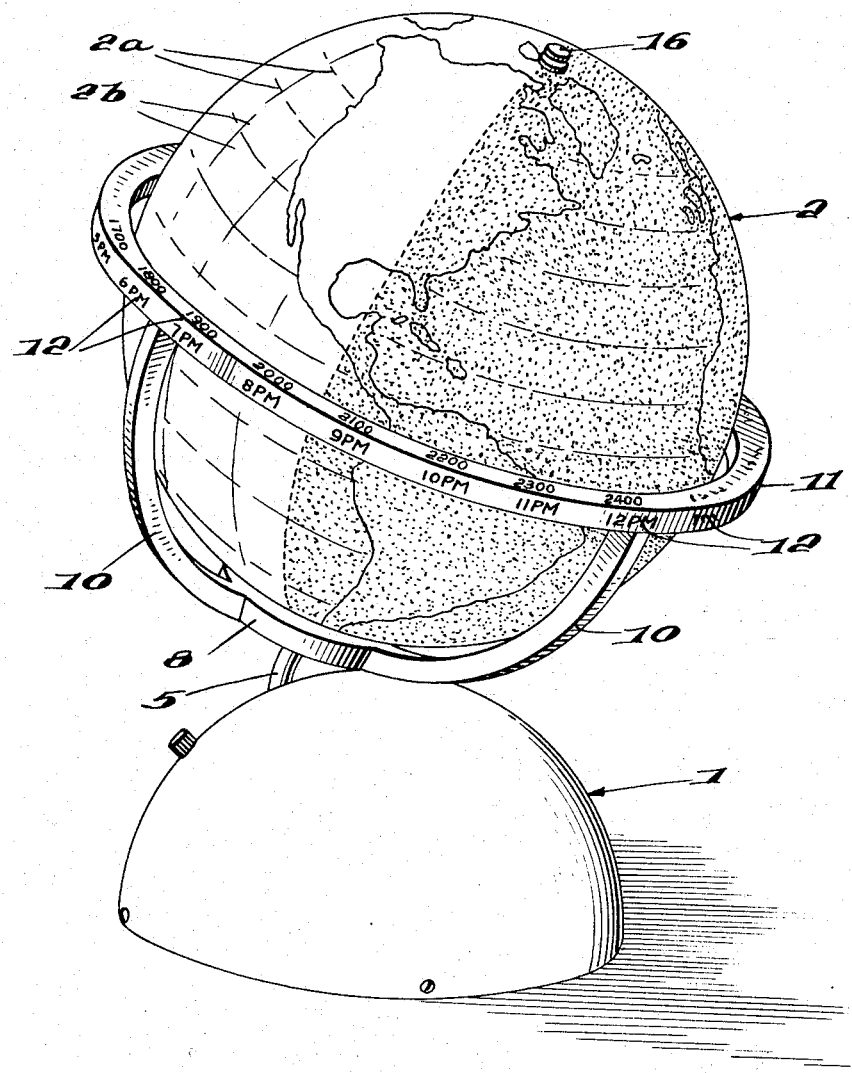
FIG. 1 is a perspective view showing one form of global clock incorporating this invention.

The global clock illustrated in FIGS. 1 and 2 comprises a base 1 upon which a globe 2 is mounted and supported for turning movement at an angle which corresponds substantially with the angle of revolution of the world.

The globe 2 may be made of a suitable transparent or translucent material having map illustrations depicted thereon, either being applied directly to the material forming the globe or being superposed thereon. It is preferred that lines of latitude 2a be applied over the map illustrations and around the surface of the globe and preferably also lines of longitude, as indicated at 2b. These may be used, not only to increase the use of the globe, but also to correlate the time indications thereto. It is also preferred that time bands be applied accurately along the surface of the globe corresponding with the respective time zones. These are not illustrated, but the location thereof is governed by standard map characterizations.

The base 1 is in the form of a semi-spherical housing, preferably formed of metal or other suitable material and having a base plate 3 closing the bottom thereof and for supporting parts of the operating structure within the housing of the base.

In the form illustrated in FIG. 1, the base is adapted to sit on a table or other suitable supporting surface. However, it may be made so as to be mounted on an upright standard that sits on the floor, in which event the shape thereof may be modified according to the device to be combined therewith. Likewise, it may be combined with other appliances, such as a radio set or the like, which will also require some modification of the design thereof.

Mounted within the shell or housing forming the base 1 and supported in suitable manner thereon, as for example, on the plate 3, is an upright support, indicated at 4, extending through the top of the shell or housing forming the base and turned at an obtuse angle with respect thereto, the upper end portion of said support being indicated at 5. In the embodiment shown, this support 4–5 is tubular or in the form of a pipe, the sections of which are shown as connected together by a T coupling 6 to facilitate the threading of electrical connections therethrough, as hereinafter described.

Mounted on the angular portion 5 of the support 4 is a stationary cup or disc 8 held in place by a disc 9 fixed to the support. A bearing 7 is provided in the cup or disc 8, as hereinafter described. During normal operation, the cup or disc 8 remains fixed and stationary relative to the support 4 and the base 1, being held stationary by the disc 9 and the shaft 31.

Mounted on the cup or disc 8 and extending upwardly on arcs therefrom are arms 10 spaced apart a suitable distance circumferentially. The arms 10 support at their upper ends a band 11 which is adapted to extend around the equator of the globe and is disposed in a plane normal to the axis of the angular support section 5. This time band 11 may be made of Lucite or other suitable plastic material or of metal, if desired. The time band 11 may be provided with indicia, indicated at 12, on one or more surfaces thereof for designating time in the respective portions of the globe. The time-indicating figures may be either indented or raised or otherwise applied to one or more surfaces of the time band as found most expedient.

The time band 11 can be internally illuminated for added interest and attractiveness. If formed of Lucite, the source of illumination may be applied at one point along the length of the band and will be transmitted therethrough. The nature of this material will cause the time indicating figures to stand out.

Supported in bearing relation upon the cup or disc 8, or suitably mounted for turning movement relative thereto, is a ring 13, which is shown as U-shaped in cross section, to form a clamp ring. The globe 2 is formed as a hollow body having an enlarged opening 14, the surrounding edges of which are received within the periphery of the clamp ring 13. The sides of the clamp ring embrace the portions of the globe 2 surrounding the opening 14 and are secured thereto by this clamping action. Other securing means may be used, if desired, to form a tight connection between the globe and the clamp ring.

At the opposite side, on the axis of rotation of the globe 2, the latter is provided with a hub portion 15 within which is mounted a cap 16. The hub 15 is rotatable relative to the cap 16 and suitable journal means may be provided therebetween.

A support member is shown at 17, the upper end of which is offset and secured rigidly to the cap 16 surrounding the axis of rotation of the globe 2. The lower end of the support member 17 is turned laterally and secured rigidly to a connection 18 mounted on the upper end portion of the offset support member 5.

Mounted on the upper end portion of the support member 4–5 is a source of illumination, illustrated as an electric lamp 19. The electric lamp 19 should be mounted in a suitable support 19' which will withstand shock and vibration to insure of long life of the lamp, especially if it should have an incandescent filament. A rubber mounting on the support member 5 for the lamp socket 19', or formed of other cushion material, will tend to reduce the transmission of vibration to the lamp and increase the effective life thereof.

A source of electric current may be connected with the electric lamp through electric wires or cable 20.

A shade or reflector is shown at 21 extending over a portion of the electric lamp 19 as, for example, the side thereof at the right in FIG. 2. This shade or reflector is provided with ears 22 embracing opposite sides of the support member 17 and pivotally connected thereto at 23, so as to permit of rocking movement of the shade or reflector 21 about the axis of the pivot 23. At the same time, the shade 21 extends over approximately one-half of the circumference of the lamp 19 throughout its length and the opposite side may be unshaded. Suitable nonglaring means may be used on said opposite side, if desired, as, for example, by the application of paint or other translucent material thereto. This will serve to keep approximately one-half of the surface of the transparent or translucent globe 2 in a darkened condition with respect to theother one-half and thereby indicate the portion of the earth's surface wihch is in darkness through lack of daylight, while the other one-half would represent the area receiving sunlight at a particular time.

Provision is made also for indicating the effect of changing seasons by rocking the reflector 21 about its pivot 23, which thereby serves to move the portion of the darkened area longitudinaly of the polar axis of the globe. This rocking motion may be accomplished by a crank arm linkage 24 connected with the reflector 21 at 25. The operating rod 26 is in the form of a small shaft that extends through the upper offset portion of the support member 17 to the periphery of the globe 2. At its upper end, the shaft 26 is provided with an arm or pin 27 extending through a side of the cap 16 so as to rotate the shaft 26 on its axis and thereby to effect a tilting movement of the shade 21 on the pivot 23. The disc 28 that surrounds the cap 16 may be marked with suitable indicia representing the seasons or months, as an aid in shifting the pin 27 to the correct position.

The globe 2 is adapted to be rotated by suitable means, so as to be turned one complete revolution on its polar axis during each twenty-four hour period. The globe has depicted on the surface thereof a map of the world, marked off at 2b by lines of longitude which, in general, divide the globe into time bands.

In the illustrated embodiment of this invention, a synchronous motor is used to rotate the globe 2, as illustrated at 29, preferably mounted in the shell of the base 1 and supplied with electric current through the cable or wires 20. The motor 29 is connected with suitable speed reducing gearing, generally indicated at 30, with a drive shaft 31 that extends through the top portion of the shell of the base 1. The motor 29 and gearing 30 is shown as mounted on suitable supporting brackets 32 and 33 carried by the base plate 3 and extending upwardly therefrom.

The upper end of the drive shaft 31 extends into the cap 8 wherein it is provided with a pinion 34 in mesh with a suitable drive gear 35 fixed to the ring 13 and journalled in the bearing 7. The gearing 34–35 may be of any suitable type, such as intermeshing gears, friction, ratchet, etc., which will operate the globe 2 in timed relation to turn one complete revolution in each twenty-four hour period.

The synchronous motor 29 may be connected directly with the globe 2 to cause rotation of the latter in proper timed relation. However, for practical purposes, it is desirable to have a suitable drive action which will reduce the speed of rotation of the globe 2 relative to the speed of the motor 29; and also to obtain some relative adjustment or movement. For example, it is desirable that the globe should be set in position relative to the drive means for an adjustment of the time cycle. Moreover, a relative adjustment is desirable to insure breaking of the drive means or the motor, if someone should spin the globe absentmindedly by hand. As noted above, the driving means may be in any suitable or desired form, either direct or indirect, and which preferably may be of such standard form as will provide a lost motion connection in at least one direction.

Several examples of standard types of drive means that may be utilized for these purposes include a ratchet-type of gearing, a friction clutch wherein the globe is attached to one plate and the motor is operatively connected with another, with the plates pressed into friction engagement with each other to transmit movement from the motor to the globe, and magnetic clutch which will remain engaged when energized electrically to form a driving connection from the drive means connected with the motor to the driven means connected with the globe. These several types of driving mechanism may have provisions for adjustment to vary the time indication thereof.

It will be apparent from the foregoing description that the time bands applied to the surface of the globe will cooperate with the time indicia on the ring 11 whereby to indicate the time in any particular circumferential portion of the globe. At the same time, the globe represents by dark and light areas the portions thereof that are respectively night and day, thus bringing particular cities of the world into view with respect to periods of time. The further adjustment of the shadow effects obtained by the shield during different seasons enhances the educational value of the globe and makes it more realistic and accurate.

While the invention has been illustrated and described in certain embodiments, it is recognized that variations and changes may be made therein without departing from the invention as set forth in the claims.

I claim:

1. A global clock comprising a base including a hollow shell, clock mechanism mounted within the shell, a support mounted on the base and extending upwardly in an oblique direction, a cup mounted on the support, a ring journaled on the cup for turning movement with respect thereto, means forming an opertaive driving connection between the clock mechanism and said ring, a globe fixed to the ring to rotate therewith, a second ring carried by the cup and extending around the globe externally thereof in a plane normal to the axis of rotation thereof, said globe having map portions depicted thereon with respective lines of longitude dividing the globe into time bands, indicia carried by the ring and cooperating with the time bands thereon, illuminating means mounted within the globe, a second support member carried by the first-mentioned support member and extending upwardly therefrom through the globe with a portion of the globe journaled thereon, a shade for the illuminating means, and means mounting the shade on the second support member for tilting movement relative thereto.

2. A global clock comprising a base including a hollow shell, clock mechanism mounted within the shell, a support mounted on the base and extending upwardly in an oblique direction, a cup mounted on the support, a ring journaled on the cup for turning movement with respect thereto, means forming an operative driving connection between the clock mechanism and said ring, a globe fixed to the ring to rotate therewith, a second ring carried by the cup and extending around the globe normal to the axis of rotation, thereof, said globe having map portions depicted thereon with respect time bands, indicia carried by the second ring and cooperating with the time bands, said support extending through the globe, illuminating means mounted within the globe on said support, and a support member carried by the first-mentioned support within the globe and extending upwardly therefrom with a portion of the globe journaled thereon.

3. A global clock comprising a base including a hollow shell, a clock mechanism mounted within the shell, a support mounted on the base and extending upwardly in an oblique direction, a cup mounted on the support, a ring journaled on the cup for turning movement with respect thereto, means forming an operative driving connection between the clock mechanism and said ring, a globe fixed to the ring to rotate therewith, an electric lamp mounted within the globe on said support, said support forming a conduit for wires for supplying electric current to said lamp, a support member carried by the first-mentioned support and extending upwardly therefrom through the globe with a portion of the globe journaled on the upper end portion of said support member, a shade for the illuminating means, means mounting the shade on the support member for tilting movement relative thereto, and means extending through the upper end portion of the support member to the periphery of the globe for adjusting the position of the shade relative to the illuminating means.

4. A global clock comprising a base having clock mechanism mounted therein and with an upright support extending above the base, a globe journaled on the support, means operatively connecting the globe with the clock mechanism for rotating the globe thereby, illuminating means within the globe, a support member carried by the upright support and having an upper end portion extending upwardly therefrom within the globe with a portion of the globe journaled on said upper end portion, a shade for the illuminating means, means mounting the shade on the support member for tilting movement relative thereto, and means extending through the upper end portion of the support member to the periphery of the globe for adjusting the position of the shade relative to the illuminating means.

5. A global clock comprising a base having clock mechanism mounted therein and with an upright support extending above the base, a globe journaled on the support, means operatively connecting the globe with the clock mechanism for rotating the globe thereby, illuminating means within the globe, a support member carried by the upright support and having an upper end portion extending upwardly therefrom within the globe with a portion of the globe journaled on said upper end portion, a shade for the illuminating means, said shade having a bifurcated bracket intermediate the edges of the shade, said support member extending through the bifurcations of the bracket, said shade being journaled on said support member for tilting movement relative to the support member, and means extending through the upper end portion of the support member to the periphery of the globe for adjusting the position of the shade relative to the illuminating means.

6. A global clock comprising a base having a clock mechanism mounted therein, an upright support mounted on the base, a globe having the upright support extending axially therethrough and with opposite sides of the globe journaled on spaced portions of the upright support, a time ring extending around the globe externally thereof in a plane normal to the axis of the upright support, means mounting the ring in a fixed position on the upright support, means operatively connecting the clock mechanism with the globe for rotating the globe relative to said time ring, illuminating means within the globe, a shade for the illuminating means, and means mounting the shade on the upright support for tilting movement to vary the area of illumination of the globe relative to the time ring.

7. A global clock according to claim 7, wherein the upright support extends substantially along the polar axis of the globe, and the shade is located on the opposite side of the upright support from the illuminating means and extends in embracing relation therewith to direct illumination through the globe to the time ring.

References Cited

UNITED STATES PATENTS

| | | | |
|---|---|---|---|
| 970,040 | 9/1910 | De Gounevitch | 58—44 |
| 1,515,135 | 11/1924 | Alexander | 35—46 |
| 2,000,457 | 5/1935 | Schulse | 58—44 |
| 3,049,863 | 8/1962 | Ranney | 58—44 |
| 3,197,893 | 8/1965 | Mariotti | 35—45 |

FOREIGN PATENTS 3,179 12/1912 Great Britain.

RICHARD B. WILKINSON, *Primary Examiner.*

GERALD BAKER, *Examiner.*

MICHAEL LORCH, *Assistant Examiner.*